US007068841B2

(12) United States Patent
Luo

(10) Patent No.: US 7,068,841 B2
(45) Date of Patent: Jun. 27, 2006

(54) AUTOMATIC DIGITAL IMAGE ENHANCEMENT

(75) Inventor: Huitao Luo, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 717 days.

(21) Appl. No.: 09/895,689

(22) Filed: Jun. 29, 2001

(65) Prior Publication Data

US 2003/0012414 A1    Jan. 16, 2003

(51) Int. Cl.
*G06K 9/00* (2006.01)
*G06K 9/40* (2006.01)

(52) U.S. Cl. ...................................... 382/167; 382/254
(58) Field of Classification Search ................ 382/167, 382/168, 118, 254; 358/518, 1.9
See application file for complete search history.

(56) References Cited

U.S. PATENT DOCUMENTS

| | | | | |
|---|---|---|---|---|
| 5,130,935 | A | * | 7/1992 | Takiguchi .................... 382/167 |
| 5,497,431 | A | * | 3/1996 | Nakamura .................... 382/162 |
| 5,528,339 | A | * | 6/1996 | Buhr et al. .................... 355/32 |
| 5,539,523 | A | * | 7/1996 | Nakai et al. ................. 358/296 |
| 6,535,301 | B1 | * | 3/2003 | Kuwata et al. .............. 358/1.9 |
| 6,587,225 | B1 | * | 7/2003 | Sakatani et al. ............. 358/1.9 |
| 6,748,097 | B1 | * | 6/2004 | Gindele et al. ............. 382/112 |
| 2002/0172419 | A1 | * | 11/2002 | Lin et al. .................... 382/167 |

FOREIGN PATENT DOCUMENTS

WO    WO 98/39914    9/1998

OTHER PUBLICATIONS

Materka, A. and Strzelecki, M., "Texture Analysis Methods—A Review", Technical University of Lodz, Institute of Electronics, COST B11 Report, Brussels, 1998.*
Sonka, Hlavac, and Boyle, "Image Processing, Analysis, and Machine Vision", 2nd Edition, © 1999, Brooks/Cole Publishing Company, pp. 59-60.*
Kim Y H et al: "Region Based Histogram Specification for Dynamic Range Expansion" Proceedings of the SPIE, SPIE, Bellingham VA US vol. 3302, 1998 pp. 90-97.

(Continued)

*Primary Examiner*—Vikkram Bali
*Assistant Examiner*—Colin LaRose

(57) ABSTRACT

A method and apparatus for enhancing a digital image. First, human faces are located within a digital image. The digital image is then analyzed, including analysis of the regions determined to be human faces and the analysis of the digital image as a whole. A tone mapping function is then determined for enhancing the image quality of the digital image. The tone mapping function is determined using both the analysis of detected faces and the analysis of the image as a whole to obtain a tone mapping function that incorporates both psychological factors (e.g., average face region lightness and average picture lightness) and signal factors (e.g., digital resolution, face region contrast, histogram uniformity, and noise issue). The tone mapping function is then applied to the digital image so as to produce an enhanced digital image. The present invention is automatic and does not require that the user provide any input. In addition, because the method and apparatus of the present invention incorporates both psychological factors and signal factors, the resulting enhanced images are perceived to be of good image quality.

21 Claims, 6 Drawing Sheets

OTHER PUBLICATIONS

Fischer S et al: "Analysis of skin lesions with pigmented networks" Proceedings of the International Conference on Image Processing (ICIP) Lausanne, Sep. 16-19, 1996, New York, IEEE US vol. 1 pp. 323-326.

* cited by examiner

200

```
┌─────────────────────────────────────┐
│   LOCATE HUMAN FACES WITHIN DIGITAL │
│              IMAGE                  │
│               201                   │
└─────────────────┬───────────────────┘
                  │
┌─────────────────┴───────────────────┐
│ ANALYZE DIGITAL IMAGE INCLUDING ANALYSIS │
│ OF BOTH HUMAN FACES LOCATED IN STEP 201 │
│ AND ANALYSIS OF DIGITAL IMAGE AS A WHOLE │
│               202                   │
└─────────────────┬───────────────────┘
                  │
┌─────────────────┴───────────────────┐
│  DETERMINE TONE MAPPING FUNCTION FOR │
│ ENHANCING THE QUALITY OF THE DIGITAL IMAGE │
│               203                   │
└─────────────────┬───────────────────┘
                  │
┌─────────────────┴───────────────────┐
│ APPLY TONE CONVERSION FUNCTION TO DIGITAL │
│  IMAGE TO OBTAIN ENHANCED DIGITAL IMAGE │
│               204                   │
└─────────────────────────────────────┘
```

FIG. 2

AUTOMATIC DIGITAL IMAGE ENHANCEMENT

BACKGROUND OF THE INVENTION

1. Field of the Invention

The present invention relates to the field of digital image processing. More specifically, the present invention relates to a method and apparatus for enhancement of digital images.

2. Related Art

Digital cameras and scanners have become increasingly popular in recent years for generating digital images. Because of the recent decreases in cost for digital cameras and scanners, more and more photo pictures are generated, transmitted and saved in digital forms by amateur users instead of professionals. Unlike professional photos, photos produced by amateur users tend to suffer from poor image quality. These image quality problems result from under exposure, over exposure, poor lighting conditions, bad focus, inappropriate scanning processes, etc.

For the above reasons, it is important to design ways to guarantee picture quality in a way that requires the least user input and that works mainly on itself, so that even amateurs can use it. The point-and-shoot camera is a good example of a product that is designed to meet this requirement.

Digital processing methods typically focus on the picture capture stage, i.e., exposure setting, focus control, etc. The state of the art in digital camera design has been quite successful by emulating traditional analog film cameras. However, camera design can not solve all of the quality problems because picture quality is partially a psychological problem.

Digital post-processing methods have been designed that include image enhancement algorithms that improve image quality. Among recent image enhancement algorithms, a tone mapping algorithm is generally employed for adjusting the distribution of pixel values to produce better quality. The use of a tone mapping algorithm has been quite successful for satellite photos, airborne photos and medical images. For these applications, a major quality enhancement purpose is to illustrate the details of the images. However, these algorithms do not work well on consumer photos, because for consumer photos, the quality enhancement is more of a psychological problem than a mathematical problem, and detail illustration is not necessarily an important factor for quality evaluation.

Recently, some computer programs have been developed for digital image enhancement for consumer pictures. An example of a successful program that provides digital image enhancement is Photoshop, a software product manufactured by Adobe. Though Photoshop includes a large repository of processing tools, it does not offer automatic processing. Users have to choose appropriate tools and parameters for their pictures based on their own judgment. Therefore, this is not a good tool for amateur users as they cannot easily determine the proper tools to use or the proper parameters to specify.

What is needed is a method and apparatus for enhancing a digital image that produces images that are perceived to be of good image quality. In particular, a method and apparatus for enhancing a digital image is needed that produces an enhanced digital image that is perceived to be of good image quality to amateur users. Also, what is needed is a method and apparatus that meets the above needs and that is automatic. Moreover, a method and apparatus is needed for enhancing a digital image that meets the above needs and that does not require user input.

SUMMARY OF THE INVENTION

The present invention provides a method and apparatus for enhancing a digital image that is automatic and that does not require user input. In addition, the method and apparatus of the present invention produces an enhanced image that is perceived to be of good image quality.

The majority of consumer photos include human faces. According to recent psychological studies, face region lightness plays an important role in picture quality evaluation. The method for enhancing a digital image of the present invention incorporates this psychological factor to produce an enhanced image that is perceived to be of good image quality.

In one embodiment of the present invention, each digital image is converted from its original format into a format suitable for easy manipulation. In the present embodiment, the digital image is converted from its original format into CIE L *a*b* color space. Conversion of a digital image from its original format into L *a*b* color space as is more fully described in "Color Space Conversions," by Adrian Ford and Alan Roberts, September 1996, which is available at www.inforamp.net/~poynton/PDFs/coloureq.pdf, which is incorporated herein, by reference, in its entirety. The resulting format includes a L* component that represents the lightness of each pixel of the image. The format also includes a* and b* components that represent the chromatic features of each pixel of the image.

The method for enhancing a digital image of the present invention locates human faces within a digital image. In the present embodiment, a face detection algorithm is used to detect human faces. The digital image is then analyzed, including analysis of the regions determined to be human faces and the analysis of the digital image as a whole. A tone mapping function is then determined for enhancing the image quality of the digital image. The tone mapping function is determined using both the analysis of detected faces and the analysis of the image as a whole to obtain a tone mapping function that incorporates both psychological factors (e.g., average face region lightness and average picture lightness) and signal factors (e.g., digital resolution, face region contrast, histogram uniformity, and noise issue).

The tone mapping function is then applied to the digital image so as to produce an enhanced digital image. In one embodiment the tone mapping function is directly applied to each pixel element to obtain an enhanced digital image. In another embodiment of the present invention a lookup table is generated that represents the tone mapping function. The look up table is applied to the entire digital image to map an enhanced digital image. More particularly, in the present embodiment, each lightness (L*) component is altered according to the values stored in the lookup table to generate an enhanced digital image having altered tone values. The components that represent the chromatic features are not altered (i.e., a* and b* components are not changed).

The present invention is automatic. That is, the user needs only initiate operation of a program that performs the method of the present invention. All of the steps of the present invention are then performed automatically. Therefore, there is no need for a user to choose between a variety of tools to determine the appropriate tools to use as is required in prior art methods.

The method and apparatus of the present invention does not require that the user provide any input. Therefore, there is no need for a user to determine various parameters that must be specified as is required by prior art methods.

Accordingly, the method and apparatus of the present invention is a good tool for amateurs to use as they will not be required to determine the proper tools to use or determine the proper parameters to specify as is required by prior art processes. In addition, the method and apparatus of the present invention is easy to use since the user needs take no action other than initiation of the program that is operable to perform the method of the present invention. Also, the method and apparatus of the present invention produces enhanced images that are perceived to be of good image quality.

The present invention provides these advantages and others which will no doubt become obvious to those of ordinary skill in the art after having read the following detailed description of embodiments in accordance with the present invention.

BRIEF DESCRIPTION OF THE DRAWINGS

FIG. 2 is a diagram that illustrates a method for enhancing a digital image in accordance with one embodiment of the present invention.

DETAILED DESCRIPTION OF THE INVENTION

Figure 1:
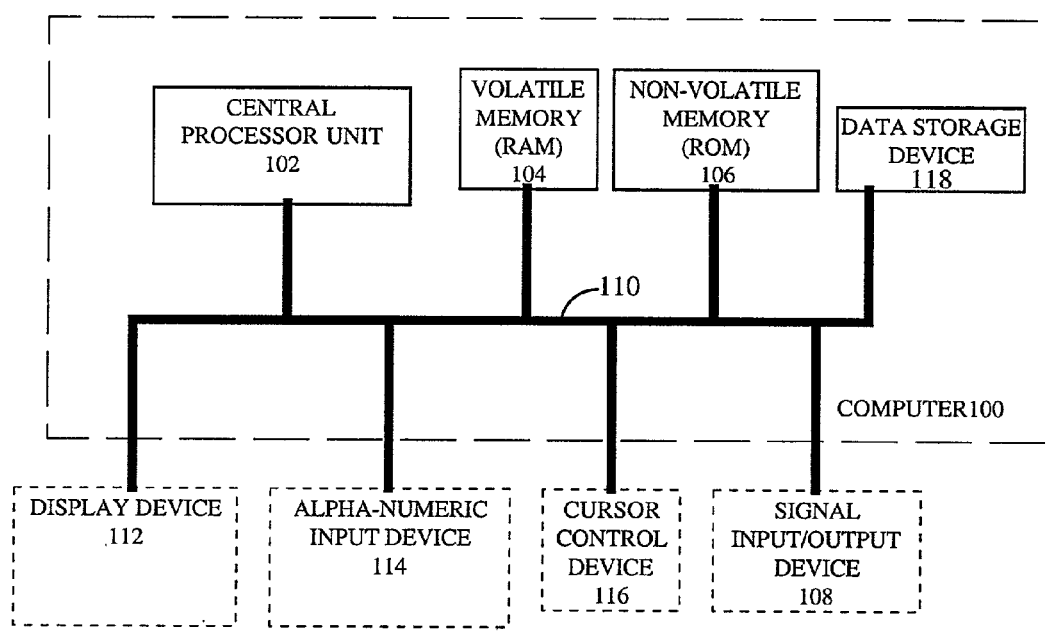
FIG. 1 is a logical block diagram of an exemplary computer system in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "determining," "locating," "analyzing," "applying," "calculating," or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Computer System in Accordance with the Present Invention

FIG. 1 is a block diagram of one embodiment of an exemplary computer system 100 used in accordance with the present invention. It should be appreciated that system 100 of the present embodiment is well suited to be implemented as any of a number of different types of computer (e.g., portable laptop computer, desktop computer, server computer, personal digital assistant, palmtop computer and the like). Within the following discussions of the present invention, certain processes and steps are discussed that are realized, in one embodiment, as a series of instructions (e.g., software program) that reside within computer readable memory units of computer system 100 and executed by processor(s) of system 100. When executed, the instructions cause system 100 to perform specific actions and exhibit specific behavior which is described in detail below.

In general, computer system 100 of FIG. 1, used by an embodiment of the present invention, comprises an address/data bus 110 for communicating information, one or more central processors 102 coupled with bus 110 for processing information and instructions. Central processor unit 102 may be a microprocessor or any other type of processor. The computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. System 100 also includes an optional signal input and output device 108 coupled with bus 110 for enabling system 100 to interface with other electronic devices. In one embodiment of the present invention, the communication interface 108 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, etc.

Optionally, computer system 100 can include a display device 112 which is coupled to bus 110 for displaying graphics and/or video. It should be appreciated that optional display device 112 may be a cathode ray tube (CRT), flat panel liquid crystal display (LCD), field emission display (FED), or any other display device suitable for displaying video and/or graphic images and alphanumeric characters recognizable to a user. Furthermore, system 100 can include an optional alphanumeric input device 114 including alphanumeric and function keys coupled to the bus 110 for communicating information and command selections to the central processor(s) 102.

Additionally, the computing device 100 of FIG. 1 can include an optional cursor control or cursor directing device 116 coupled to the bus 110 for communicating user input information and command selections to the central processor (s) 102. The cursor directing device 116 can be implemented using a number of well known devices such as a mouse, a track-ball, a track pad, an optical tracking device, a touch screen, etc. Alternatively, it is appreciated that a cursor can be directed and/or activated via input from alphanumeric input device 114 using special keys and key sequence commands. The present invention is also well suited to directing a cursor by other means such as, for example, voice commands. In addition, the cursor directing device 116 can also be a remote control device (e.g., a universal remote control device having a number of buttons, dials, etc.) with an infra-red signal communication capability. System 100 can also include a computer usable mass data storage device 118 such as a magnetic or optical disk and disk drive coupled with bus 110 for storing information and instructions.

Method for Automated Digital Image Enhancement

Figure 3:
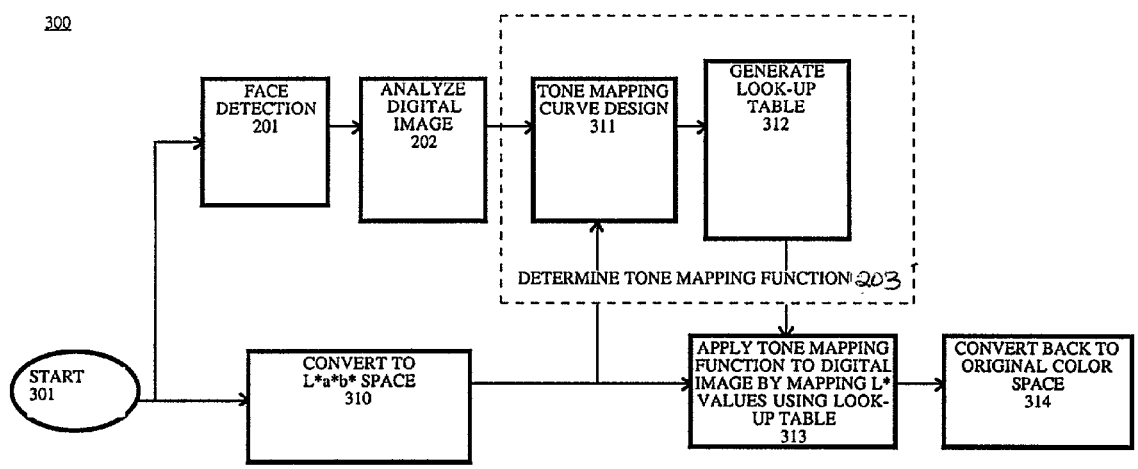
FIG. 3 is a diagram that illustrates a method for enhancing a digital image that uses a look-up table and in which the original image is converted into L*a*b* space in accordance with one embodiment of the present invention.

FIGS. 2–3 show methods 200 and 300 that illustrate steps performed in accordance with embodiments of the present invention for automated digital image enhancement. Methods 200 and 300 include processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer-readable medium. In one embodiment of the present invention a computer readable medium is used to store instructions for performing the method of the present invention. In this embodiment the computer-readable medium is a magnetic or optical storage device such as a disk drive, magnetic tape, Compact Disk(CD), DVD (digital versatile disk or digital video disk). In yet another embodiment, the method of the present invention is performed using computer instruction signals embodied in a transmission medium (with or without a carrier wave upon which the signals are modulated). For example, the transmission medium may include a communications network such as the Internet.

Although specific steps are disclosed in methods 200 and 300 of FIGS. 2–3, such steps are exemplary. That is, the present invention is well suited to performing various other steps or variations of the steps recited in FIGS. 2–3. Within the present embodiment, it should be appreciated that the steps of methods 200 and 300 may be performed by software or hardware or any combination of software and hardware.

As shown by step 201 of FIGS. 2–3, human faces are located within the digital image. In the present embodiment, a face detection algorithm is applied to the digital image for locating faces within the digital image. In one embodiment, a neural network based algorithm is applied to the digital image to identify any faces within the digital image.

In the embodiment shown in FIG. 2, the digital image can be manipulated using the format in which it is received or using any of a number of different common formats for analysis and manipulation of the digital image.

In the embodiment shown in FIG. 3, each digital image is converted from its original format into L *a*b* color space as shown by step 310. For convenience, the present invention is described with reference to L*a*b* color space in the remainder of the detailed description. However, it is appreciated that other formats and corresponding tone mapping values could also be used.

As shown by step 202, the digital image is analyzed. In the present embodiment, the analysis includes analysis of the faces located in step 201 and the analysis of the digital image as a whole.

Continuing with step 202, in the present embodiment, the regions of the image that were identified to be human faces are analyzed to determine average face region lightness ($L_f$). Average face region lightness can be determined by calculating the mean of the L* level of the human faces detected in the digital image. In the present embodiment, the human faces are also analyzed to determine face region contrast.

In the present embodiment, the entire picture is analyzed to determine average picture lightness ($L_p$). The average picture lightness can be determined by calculating the mean of the L* level of the whole picture. The entire picture is also analyzed for determining digital resolution and histogram uniformity.

A tone mapping function is then determined as shown by step 203 for enhancing the image quality of the digital image. In the present embodiment, the tone mapping function is a one-dimensional global function that maps one input value to only one output value. In one embodiment, the tone mapping function is based on the statistical measurement of the whole image as well as the measurement of face regions contained in the digital image. In the present embodiment, the face region(s) are treated as a region of interest and are treated independently in the determination of the tone mapping function as compared to the image as a whole.

In the present embodiment, the psychological factors of face region lightness and average picture lightness are used in addition to signal factors(digital resolution, face region contrast, histogram uniformity and noise issue) in determining the tone mapping function.

The tone mapping function can be represented in graphical form by a tone mapping curve. In the present embodiment, the tone mapping curve is an integer-to-integer mapping curve in which both x and y integers are in the range of from 0 to 255. This conforms to the range of lightness (L)

within a conventional L*a*b* format. However, other ranges can be used to accommodate different formats.

In the embodiment shown in FIG. 3, the tone mapping function is determined (step 203) by first designing the tone mapping curve as shown by step 311 and using the tone mapping curve to generate a look-up table as shown by step 312.

As shown by step 204, the tone mapping function determined in step 203 is applied to the digital image so as to produce an enhanced digital image. In the embodiment shown in FIG. 3, the tone mapping function is applied to the digital image by mapping the L* values using the look-up table. More particularly, in the present embodiment, each L* value within the digital image is replaced with a corresponding L* value from the lookup table. Thereby, the tone values of the original digital image are altered, producing an enhanced digital image.

In the embodiment shown in FIG. 3, the digital image is converted back into its original format. More particularly, the image is changed from the L*a*b* format back into the original format or "color space".

In the present embodiment, steps 201 through 204 of FIGS. 2–3 and steps 310–314 of FIG. 3 are performed automatically and without any user input. In one embodiment, the steps of methods 200 and 300 are performed by a computer program upon initiation of the computer program to perform the method of the present invention. The computer program then performs steps of methods 200 and 300 automatically, resulting in the creation of an enhanced digital image. In the present embodiment, the program does not require the user to provide any input or make any choices between different options to obtain the resulting output of an enhanced digital image.

The tone mapping process of the present invention only alters the L* value, leaving the a* and b* components unchanged. This approach improves the lightness distribution of the digital image while maintaining the original chromatic information.

Tone Mapping Function a. Psychological Factors

Because human eyes adapt rapidly to the level of a relatively small angle in the visual field around the current fixation point, human eyes are only sensitive to relative luminance difference rather than absolute luminance difference. Accordingly, the psychological factors in the tone mapping function of the present are designed from two aspects, average face region lightness ($L_f$) and average picture lightness ($L_p$).

It has been found that human observers prefer to have both human face lightness $L_f$ and picture lightness $L_p$ to be mapped to specific optimal values optimal human face lightness ($L°_f$) and optimal picture lightness ($L°_p$). Human face lightness $L_f$ and picture lightness $L_p$ are coupled in influencing the subjective quality evaluation of an image. However, the two optimal values of optimal human face lightness $L°_f$ and optimal picture lightness $L°_p$. can not always be obtained for a particular digital image. For example, one bright face may be captured with a dark background.

It has been found that human evaluation of picture quality is pretty gradual with respect to the values of human face lightness $L_f$ and picture lightness $L_p$. Therefore, some pictures still get good quality evaluation with their human face lightness $L_f$ and picture lightness $L_p$ close to the optimal values. The tone mapping function of the present invention takes advantage of this by using optimal ranges instead of optimal values.

Figure 4:
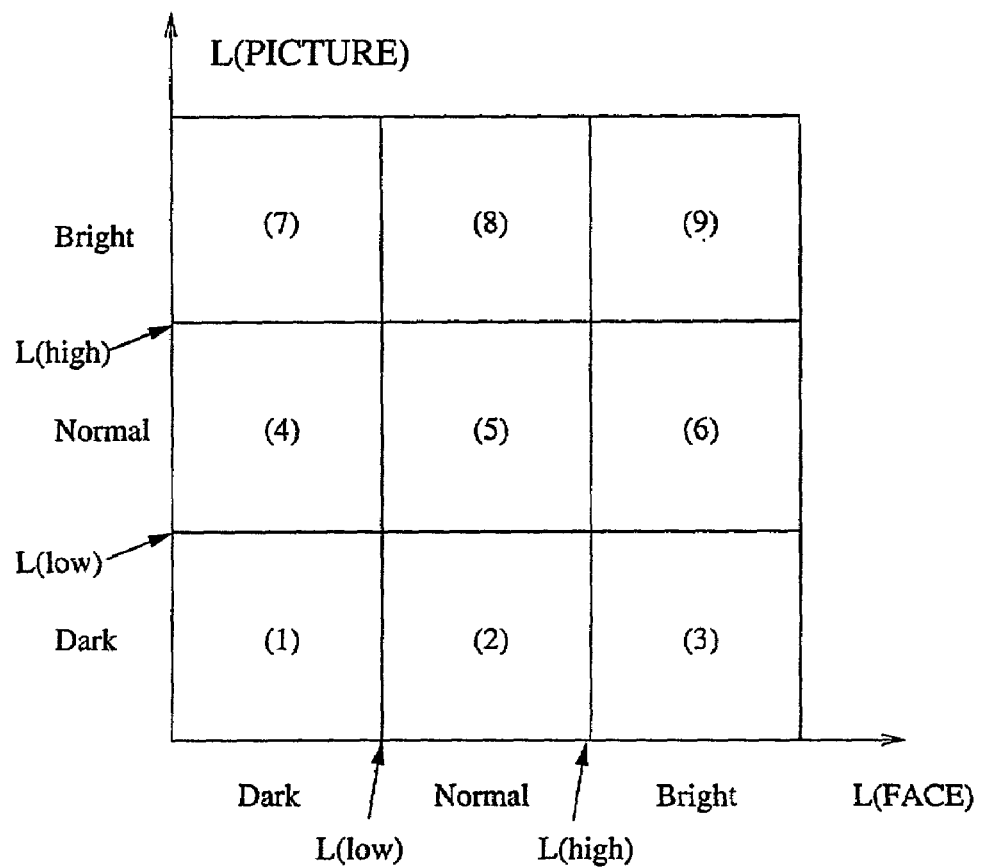
FIG. 4 is a diagram that shows an exemplary two dimensional feature space in which the energy function for psychological evaluation is performed in accordance with an embodiment of the present invention.

FIG. 4 shows an example of an embodiment of the present invention in which optimal ranges are used for human face lightness $L_f$ and picture lightness $L_p$. Along the axes of $L_f$ and picture lightness $L_p$, their optimal region is defined as ($L_f^{low}$, $L_f^{high}$) and ($L_p^{low}$, $L_p^{high}$) respectively. With optimal range definitions for human face lightness $L_f$ and picture lightness $L_p$, pictures are classified into three categories: Dark, Normal and Bright along the two axes of human face lightness $L_f$ and picture lightness $L_p$. When coupling these two parameters, pictures can be classified into nine categories in a two dimensional space. In the present embodiment, given a picture with parameters ($L_f$, $L_p$), psychological based quality evaluation is represented as an energy term $E_{ps}(L_f, L_p)$. This gives a quality improvement problem that is formulated as an energy minimization (or maximization) problem in a two dimensional space as indicated by the following equation:

$$\min_{L_f, L_p} E_{ps}(L_f, L_p) \tag{1}$$

To represent the coupled relationship between $L_f$ and picture lightness $L_p$ in determining the visual quality of the picture, the energy function $E_{ps}$ is defined as a two dimensional function of human face lightness $L_f$ and picture lightness $L_p$ individually over the nine sub-regions that correspond to the nine image categories of FIG. 4. In the present embodiment, the energy function $E_{ps}$ is defined as follows:

$$E_{ps}(L_f, L_p) = W_f^{(i)} \cdot (L_f - L_f^{o(i)})^2 + W_p^{(i)} \cdot (L_p - L_p^{o(i)})^2, \tag{2}$$

where $L_f^{o(i)}$ and $L_p^{o(i)}$ represent the optimal mean L* value for the face and picture regions if the input image has the ($L_f$, $L_p$) pair located within the i-th region of FIG. 4. A human face lightness weighting factor ($W_f^{(i)}$) and a picture lightness weighting factor ($W_p^{(i)}$) are also used. Two different sets of optimal values ($L_f°$, $L_p°$) are defined for human face lightness $L_f$ and picture lightness $L_p$ over the nine image categories/regions. For input images located within regions 1 to 8, both optimal human face lightness $L_f°$, and optimal picture lightness $L_p°$ are set to 120 (out of an 8-bit dynamic scale that runs from 0 to 255). However, images that fall within region 9, will have an optimal human face lightness $L_f°$, and optimal picture lightness $L_p°$ that are both set to 141. In addition, the optimal region of both human face lightness $L_f$ and picture lightness $L_p$ are set as (100, 140).

Figure 5:
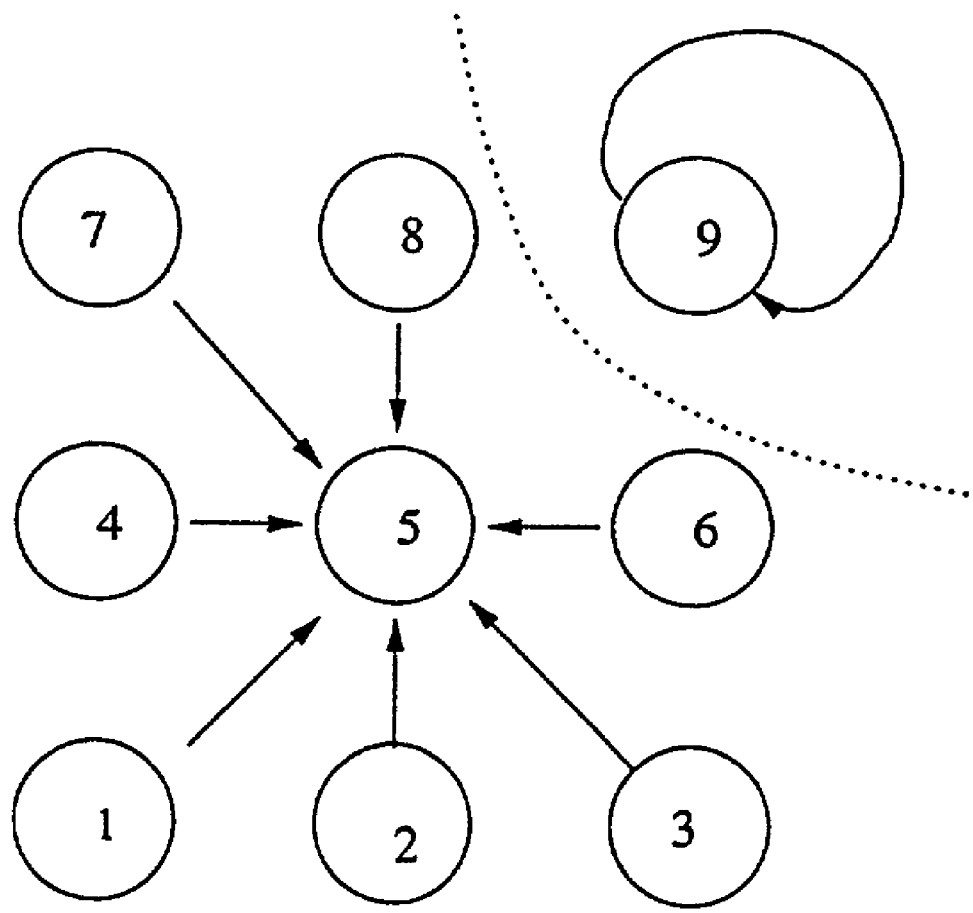
FIG. 5 is a diagram of a state machine depiction of the tone mapping function of the present invention based on nine-category classification of input images in accordance with an embodiment of the present invention.

FIG. 5 illustrates an enhancement pattern produced by the present definition of quality evaluation when only psychological evaluation is considered. It can be seen that input pictures are divided into nine categories based on their picture level and ROI (face regions) statistics. With each category being represented as a state, the tone mapping function can be modeled as a state machine in that it tries to push the input picture from one state into another new state by mapping the lightness of the pixels. The introducing of a separate set of optimal parameters for pictures in region 9 will ultimately lead to two absorbing states: state 5 and state 9 for this state machine. These two absorbing states represent the convergence output of the present tone mapping algorithm if it is applied to an input image repeatedly. In practice, we find that this design helps better address human eye's sensitivity to the relative lightness and produces better visual results on these pictures with bright backgrounds.

b. Signal Factors

Though psychological factors suggest that picture statistics human face lightness L, and picture lightness $L_p$ should be always mapped to their optimal values optimal human face lightness $L_f^o$, and optimal picture lightness $L_p^o$, in a global mapping scenario, Equation (2) can not be easily minimized because human face lightness $L_f$ and picture lightness $L_p$ are not independent. They are each based on picture signals and constrained by certain signal features. Therefore in the present embodiment, a number of signal factors are also included into consideration for tone mapping design.

Digital resolution is a signal factor that is included in the present tone mapping function. For a 8-bit picture, it is desirable to make good use of 8-bit resolution. That is, the grayscale histogram of the picture should be distributed over the full range of values (in the present embodiment from 0 to 255). In the present embodiment, the concept of shadow $L_s$ and highlight $L_h$ are used to compensate for digital resolution. Shadow $L_s$ and highlight $L_h$ both represent the grayscale boundary that clips the darkest (or brightest) 0.5 percent of the picture pixels. If shadow $L_s$ is greater than zero or highlight $L_h$ is less than 255, a linear stretch is applied to map shadow and highlight to the scale of from 0 to 255 to get full digital resolution of the picture.

Face region contrast, represented by the greyscale standard deviation of the face regions ($\delta$), is a signal factor that is included in the present tone mapping function. Since human faces are considered as a region of interest, it is also desirable to use more digital grayscale resolution for face regions. Therefore, in the present embodiment, face region contrast $\delta$ is always increased when possible.

Histogram uniformity is a signal factor that is also included in the present tone mapping function. Though extreme uniformity of histogram (i.e., histogram equalization) is not desirable for consumer photos, uniformity of the histogram distribution is still an important factor from signal presentation point of view. Therefore, it is considered as a signal constraint.

Noise issue is another signal factor that is included in the present tone mapping function. The tone mapping function is an integer to integer mapping function that can be represented by a mapping curve. A large slope of the mapping curve tends to magnify small image noise, and is therefore a negative factor that is included in the present tone mapping function.

c. Tone Mapping Curve Design

The tone mapping function of the present invention is designed to cover both psychological and signal factors. Because psychological factors and signal factors are different semantics, in the present embodiment, their independent influences are combined with a system energy formulation. That is, the desirable tendency of the psychological and signal constraints are each formulated as their respective energy terms, psychological energy ($E_{ps}$) and signal factor energy ($E_{signal}$). The overall optimization of the tone curve design is then expressed as an energy minimization problem of the system energy term Min(E)=min($E_{ps}$+$E_{signal}$). Here the minimization of the system energy is actually to find appropriate trade-offs between multiple constraints that contribute from different aspects to the same problem.

d. Parametric Curve Representation

Figure 6:
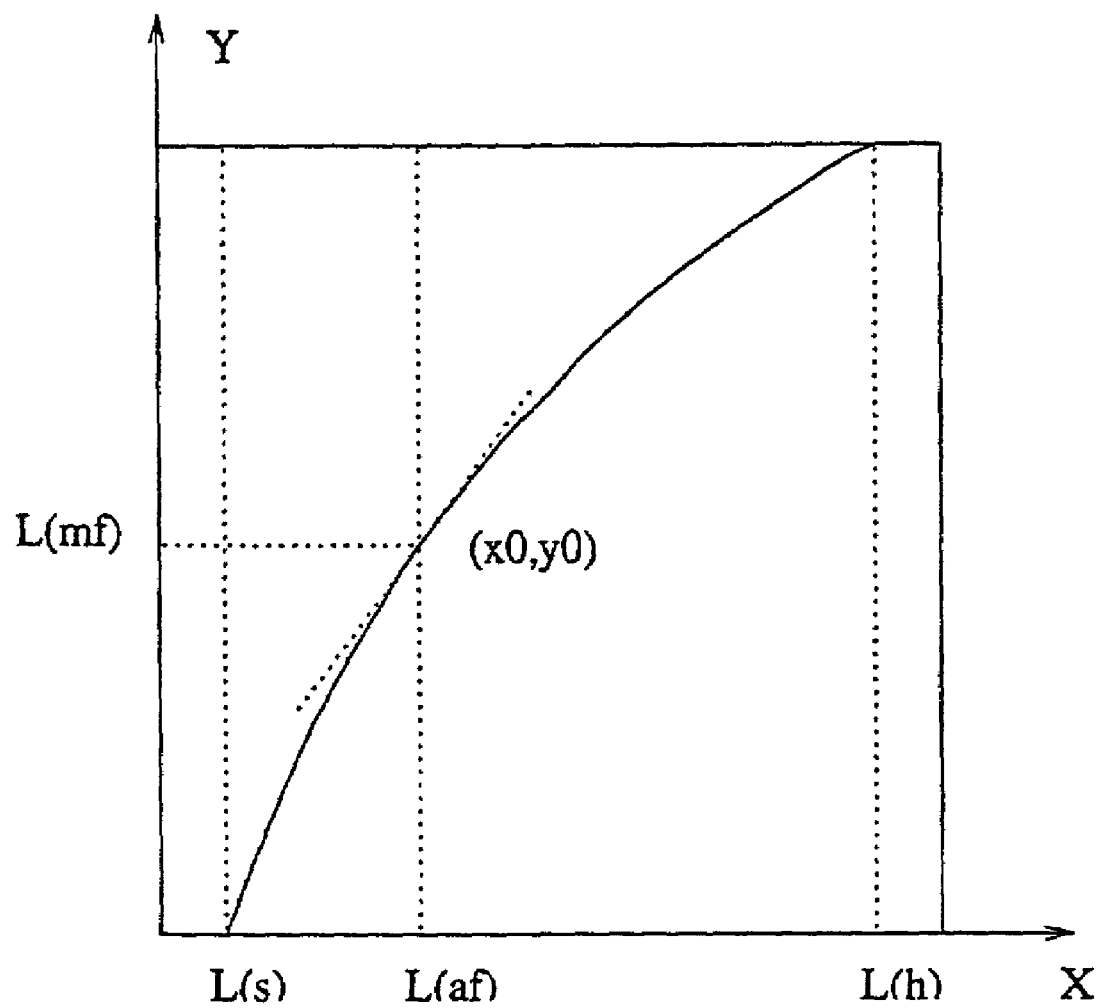
FIG. 6 is a graph of an exemplary tone mapping curve in accordance with an embodiment of the present invention.

The tone mapping function T: x→y is an integer-to-integer mapping curve with both its input and output defined in the range of 0 to 255. To accommodate the mapping control of human face regions, the mapping function is designed as a two-segment gamma curve, an example of which is depicted in FIG. 6. In FIG. 6, axis x represents the input and axis y represents the output grayscale respectively. $L_s$ and $L_h$ are the shadow and the highlight of the input image histogram and $L_{af}$ and $L_{mf}$ are the actual mean L* and the mapped mean L* of the face region. For simplicity of discussion, the control pair ($L_{af}$ and $L_{mf}$) is denoted as a control point ($x_o$, $y_o$) (i.e., $L_{af}=x_o$ and $L_{mf}=y_o$). The parametric curve of the present invention then becomes:

$$\frac{y}{y_0} = \left(\frac{x - L_s}{x_0 - L_s}\right)^{a_1}, x \in [L_s, L_{af}] \qquad (3)$$

$$\frac{1-y}{1-y_0} = \left(\frac{L_h - x}{L_h - x_0}\right)^{a_2}, x \in [L_{af}, L_h] \qquad (4)$$

To decide the two gamma values $a_1$ and $a_2$, we require that the two segments be first order smooth at the control point ($x_o$, $y_o$). That is, their first order derivatives at this point are equal. If we denote this derivative as y', then we have the equations:

$$a_1 = \frac{x_0 - L_s}{y_0} \cdot y' \qquad (5)$$

$$a_2 = \frac{L_h - x_0}{1 - y_0} \cdot y' \qquad (6)$$

Therefore, the tone mapping curve as defined in Equations. (3)–(6) is fully decided by three parameters ($x_o$, $y_o$, y'). The design work is then to decide these three parameters based on the psychological and signal factors.

e. Determination of y'

In the present embodiment, y' is the slope of the curve at ($x_o$, $y_o$). It therefore controls the grayscale contrast of the mapped face region. If we denote the standard deviation of the L* signal of the face region before the tone mapping as $\delta_{af}$ and denote the standard deviation of the L* signal of the face region after the tone mapping as $\delta_{mf}$, then the slope is $$y' = \frac{\delta_{mf}}{\delta_{af}}.$$

As detected face regions are considered as the region of interest, it is always desirable to increase the mapped deviation of the face regions $\delta_{mf}$ as long as it does not interfere with the grayscale distribution balance of the mapped picture. Therefore, we require that the mapped deviation of the face region be greater than the deviation of the face region of the original digital image ($\delta_{mf} \geq \delta_{af}$).

In the present embodiment, the mapped deviation of face region is determined as follows. First, the histogram density at the neighborhood of $L_{af}$ is measured over the histogram of the original picture using the following equation:

$$\text{Density}_{af} = \frac{\sum_{i=(L_{af}-\delta_{af}/3)}^{(L_{af}+\delta_{af}/3)} hist(i)}{2/3 \cdot (\delta_{af})} \quad (7)$$

A histogram density ratio is then obtained by comparing this histogram density with the average histogram density of the picture using to the following equation:

$$k = \frac{\text{Density}_{af}}{\text{width} \cdot \text{height}/255} \quad (8)$$

The mapped deviation of the face region is then decided based on histogram density ratio and a constant magnifying factor of 1.2 according to the equation:

$$\delta_{mf} = 1.2 \cdot k \cdot \delta_{af} \quad (9)$$

Accordingly, in the present embodiment, a balance between histogram uniformity and better face region contrast is obtained. Considering the consistency in the basic features of face regions, to avoid overdoing the contrast enhancement, we also set up an upper bound of $\delta_{mf}$. This is, if $\delta_{mf}$ produced from Equation (9) makes $\delta_{mf} \geq \Delta_{max}$, we set $\delta_{mf} = \Delta_{max}$. After $\delta_{mf}$ is determined, the slope y' is simply set as $$y' = \frac{\delta_{mf}}{\delta_{af}}.$$

f. Determination of $(x_o, y_o)$

The control point $(x_o, y_o)$ is represented by the control pair $(L_{af}, L_{mf})$. In the present embodiment, $L_{af}$ is obtained directly from face detection. If more than one face is detected, $L_{af}$ is set as the weighted mean of the means of all the faces (weighted by the area of the faces).

In the present embodiment, the mapped mean L* of face regions $L_{mf}$ is determined based on system energy minimization as:

$$L_{mf} = y_0 = \arg\min_y (E_{ps}(y) + E_{signal}(y)) \quad (10)$$

In the present embodiment, $E_{ps}$ is defined using Equation (2). Referring now back to Equation (2), $L_f = y$ and $L_p$ is a function of y, once the slope y' is determined. Therefore, $E_{ps}$ is a function of y while $E_{signal}$ in Equation (10) is further decomposed into the following energy terms:

$$E_{signal}(y) = E_{uniformity}(y) + E_{model}(y) \quad (11)$$

In Equation (11), $E_{uniformity}$ represents the histogram uniformity of the mapped image:

$$E_{uniformity}(y) = \begin{cases} \frac{h_2(x_0)y}{h_1(x_0)(255-y)} - 1, & \text{if } \frac{h_2(x_0)y}{h_1(x_0)(255-y)} > 1 \\ \frac{h_1(x_0)(255-y)}{h_2(x_0)y} - 1, & \text{otherwise} \end{cases} \quad (12)$$

where $$h_1(x_0) = \sum_{x=0}^{L_{af}} hist(x) \text{ and } h_2(x_0) = \sum_{x=L_{af}}^{255} hist(x)$$

and where hist(x) is the histogram of the input picture before tone mapping.

In the present embodiment, the model energy term $E_{model}$ in Equation (11) is defined as:

$$E_{model}(y) = D \cdot (y - x_0)^2 \quad (13)$$

where D is a weighting factor. This term is mainly intended to address the noise issue. That is, if the change in grayscale mapping is big, the slope will also be big and the noises on the original image tend to get magnified on the mapped image. The weighting factor D compensates for magnification of the noises on the original image when the change in grayscale mapping is large.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for enhancing image quality of an original digital image having initial image quality issues comprising the steps of:
   a) locating human faces within said original digital image having initial image quality issues, said original digital image captured during a picture capture stage by a digital camera;
   b) analyzing said digital image, said analysis including analysis of said human faces located in step a) and including analysis of said digital image as a whole;
   c) utilizing said analysis of said faces located in step a) and using said analysis of said image as a whole to determine a tone mapping function for enhancing the image quality of said original digital image, said tone mapping function utilizing optimal ranges combined in a system energy formulation, wherein said tone mapping function combines both psychological factors and signal factors in said system energy formulation; and
   d) applying said tone mapping function determined in step c) to said digital image so as to produce an enhanced digital image different from said original digital image, wherein a mapped deviation of the human face region of the enhanced digital image is greater than the deviation of the human face region of the original digital image.

2. The method of claim 1 wherein steps a) through d) are performed automatically and without any user input.

3. The method of claim 1 wherein step a) further comprises:
   a1) applying a face detection algorithm to said digital image for locating faces within said digital images.

4. The method as recited in claim 1 wherein said psychological factors include average face region lightness and average picture lightness.

5. The method as recited in claim 1 wherein said signal factors include digital resolution and face region contrast.

6. The method as recited in claim 5 wherein said signal factors include histogram uniformity and noise.

7. The method as recited in claim 1 further comprising: generating a look-up table that corresponds to a tone mapping curve.

8. The method as recited in claim 7 further comprising: applying the tone properties within said lookup table to said digital image so as to alter the tone values of said digital image, thereby producing an enhanced digital image having altered tone values.

9. The method as described in claim 1 further comprising the steps of:
   d1) converting said digital image from an original format into a L*a*b* format prior to performing step a); and
   d2) converting said digital image back into said original format after step d) has been performed.

10. In a computer system including a processor coupled to a bus, and a memory unit coupled to the bus for storig information, a computer-implemented method for enhancing image quality of an original digital image having initial image quality issues comprising the steps of:
   a) locating human faces within said original digital image having initial image quality issues, said original digital image captured during a picture capture stage by a digital camera;
   b) analyzing said digital image, said analysis including analysis of said human faces located in step a) and including analysis of said digital image as a whole;
   c) utilizing said analysis of said faces located in step a) and using said analysis of said image as a whole to determine a tone mapping function for enhancing the image quality of said original digital image, said tone mapping function utilizing optimal ranges-combined in a system energy formulation wherein said tone mapping function combines both psychological factors and signal factors; and
   d) applying said tone mapping function determined in step c) to said digital image so as to produce an enhanced digital image different from said original digital image, wherein a mapped deviation of the human face region of the enhanced digital image is greater than the deviation of the human face region of the original digital image.

11. The method of claim 10 wherein steps a) through d) are performed automatically and without any user input.

12. The method of claim 11 wherein step a) further comprises:
   a1) applying a face detection algorithm to said digital image for locating faces within said digital images.

13. The method as recited in claim 10 wherein said psychological factors include average face region lightness and average picture lightness.

14. The method as recited in claim 10 wherein said signal factors include digital resolution and face region contrast.

15. The method as recited in claim 14 wherein said signal factors include histogram uniformity and noise.

16. A computer readable storage medium storing instructions that, when executed by a computer, cause the computer to perform a method for enhancing image quality of an original digital image having initial image quality issues comprising the steps of:
   a) locating human faces within said original digital image having initial image quality issues, said original digital image captured during a picture capture stage by a digital camera;
   b) analyzing said digital image, said analysis including analysis of said human faces located in step a) and including analysis of said digital image as a whole;
   c) utilizing said analysis of said faces located in step a) and using said analysis of said image as a whole to determine a tone mapping function for enhancing the image quality of said original digital image, said tone mapping function utilizing optimal ranges combined in a system energy formulation wherein said tone mapping function combines both psychological factors and signal factors; and
   d) applying said tone mapping function determined in step c) to said digital image so as to produce an enhanced digital image different from said original digital image, wherein a mapped deviation of the human face region of the enhanced digital image is greater than the deviation of the human face region of the original digital image.

17. The computer-readable storage medium of claim 16 wherein steps a) through d) are performed automatically and without any user input.

18. The method as recited in claim 16 wherein said psychological factors include average face region lightness and average picture lightness.

19. The method as recited in claim 18 wherein said signal factors include digital resolution, face region contrast and histogram uniformity.

20. The method as recited in claim 16 further comprising: generating a look-up table that corresponds to a tone mapping curve.

21. The method as recited in claim 20 wherein step d) further comprises applying the tone properties within said lookup table to said digital image so as to alter the tone values of said digital image, thereby producing an enhanced digital image having altered tone values.

* * * * *

UNITED STATES PATENT AND TRADEMARK OFFICE
CERTIFICATE OF CORRECTION

PATENT NO. : 7,068,841 B2
APPLICATION NO. : 09/895689
DATED : June 27, 2006
INVENTOR(S) : Huitao Luo It is certified that error appears in the above-identified patent and that said Letters Patent is hereby corrected as shown below:

In column 9, line 6, delete "L," and insert -- $L_f$ --, therefor.

In column 13, line 32, in Claim 10, delete "storig" and insert -- storing --, therefor.

Signed and Sealed this

Fifteenth Day of December, 2009

David J. Kappos
*Director of the United States Patent and Trademark Office*